United States Patent
Liu et al.

(10) Patent No.: US 6,821,633 B2
(45) Date of Patent: Nov. 23, 2004

(54) NON-CHROMATE CONVERSION COATING COMPOSITIONS, PROCESS FOR CONVERSION COATING METALS, AND ARTICLES SO COATED

(75) Inventors: Jianping Liu, Ann Arbor, MI (US); Patrick A. Scalera, Canton, MI (US); Shawn E. Dolan, Sterling Heights, MI (US)

(73) Assignee: Henkel Kommanditgesellschaft auf Aktien (Henkel KGaA) (DE)

( * ) Notice: Subject to any disclaimer, the term of this patent is extended or adjusted under 35 U.S.C. 154(b) by 25 days.

(21) Appl. No.: 10/439,713

(22) Filed: May 16, 2003

(65) Prior Publication Data

US 2003/0215653 A1 Nov. 20, 2003

Related U.S. Application Data

(60) Provisional application No. 60/381,290, filed on May 17, 2002.

(51) Int. Cl.⁷ .......................... B32B 15/04; C23C 22/34
(52) U.S. Cl. ................ 428/472; 106/14.15; 106/14.21; 106/14.25; 106/14.41; 106/14.42; 106/14.44; 148/247; 148/251; 148/273; 148/274; 148/275; 148/283; 428/472.1; 428/472.2; 428/411.1
(58) Field of Search ............................ 428/472, 472.1, 428/472.2, 411.1; 148/247, 251, 273, 274, 275, 283; 106/14.15, 14.21, 14.25, 14.41, 14.42, 14.44

(56) References Cited

U.S. PATENT DOCUMENTS

| 4,457,790 | A | 7/1984 | Lindert et al. |
|---|---|---|---|
| 4,517,028 | A | 5/1985 | Lindert |
| 4,963,596 | A | 10/1990 | Lindert et al. |
| 4,992,116 | A | 2/1991 | Hallman |
| 5,039,770 | A | 8/1991 | Lindert et al. |
| 5,089,064 | A | 2/1992 | Reghi |
| 5,125,989 | A | 6/1992 | Hallman |
| 5,266,410 | A | 11/1993 | Lindert et al. |
| 5,281,282 | A | 1/1994 | Dolan et al. |
| 5,298,289 | A | 3/1994 | Lindert et al. |
| 5,356,490 | A | 10/1994 | Dolan et al. |
| 5,449,414 | A | 9/1995 | Dolan |
| 5,476,601 | A | 12/1995 | Bershas et al. |
| 5,534,082 | A | 7/1996 | Dollman et al. |
| 6,464,800 | B1 | 10/2002 | Carlson et al. |

FOREIGN PATENT DOCUMENTS

| JP | 09263750 | 10/1997 |
|---|---|---|
| WO | WO 94/01517 A1 | 1/1994 |
| WO | WO 99/67029 A1 | 12/1999 |
| WO | WO 01/32952 A1 | 5/2001 |
| WO | WO 01/66827 A1 | 9/2001 |

*Primary Examiner*—Robert R. Koehler
(74) *Attorney, Agent, or Firm*—Brooks Kushman P.C.

(57) ABSTRACT

In at least one aspect, the invention relates to an entirely or substantially chromium-free conversion coating composition and process for conversion coating metal surfaces that provides corrosion resistance. In at least another aspect, the present invention relates to an article having a metal surface that is at least partially coated with an entirely or substantially chromium-free conversion coating that provides corrosion resistance. In certain embodiments, the conversion coating composition comprises water and (A) dissolved fluorometallate anions selected from the group consisting of $TiF_6^{-2}$, $ZrF_6^{-2}$, $HfF_6^{-2}$, $SiF_6^{-2}$, $AlF_6^{-3}$, $GeF_6^{-2}$, $SnF_6^{-2}$, $BF_4^-$, and mixtures thereof and (B) a water-soluble polymer which is a Mannich adduct of poly(4-vinyl phenol) and N-methyl ethanolamine. In other embodiments, the composition also comprises (C) a water-soluble polymer which is a Mannich adduct of poly(4-vinyl phenol) and N-methyl glucamine.

21 Claims, No Drawings

NON-CHROMATE CONVERSION COATING COMPOSITIONS, PROCESS FOR CONVERSION COATING METALS, AND ARTICLES SO COATED

CROSS-REFERENCE TO RELATED APPLICATIONS

This application claims the benefit of U.S. provisional application Ser. No. 60/381,290 filed May 17, 2002 and titled NON-CHROMATE CONVERSION COATING COMPOSITIONS AND PROCESS FOR CONVERSION COATING ALUMINUM AND ALUMINUM ALLOYS, which is hereby incorporated by reference.

BACKGROUND OF THE INVENTION

1. Field of the Invention

In at least one aspect, the present invention relates to treating metal surfaces with aqueous non-chromate acidic conversion coating compositions to increase the resistance to corrosion of the treated metal surface, either as thus treated or after subsequent overcoating with some conventional protective layer, such as organic-based protective layer.

2. Background Art

Conversion coating in general is a well known method of providing aluminum and its alloys (along with many other metals) with a corrosion resistant coating layer. Both traditional types of conversion coatings for aluminum, the chromate and phosphate types, are often environmentally objectionable, so that their use should be minimized for at least that reason. Non-chromate conversion coatings are relatively well known. For instance, conversion coating compositions and methods that do not require the use of chromium or phosphorus are taught in U.S. Pat. Nos. 5,356,490 and 5,281,282, both of which are assigned to the same assignee as this application.

In certain industries, and for certain applications, the end user of the conversion coated product dictates the level of corrosion protection that is sought from the conversion coating. For instance, OEMs have specific corrosion resistance tests for their aluminum alloy wheels. While certain conversion coatings have been suitable for imparting corrosion resistance to many types of surfaces, they have not been deemed acceptable for imparting corrosion resistance to other surfaces requiring a relatively high level of corrosion resistance, such aluminum alloy wheels.

Accordingly, is would be desirable to provide a conversion coating, a composition, and a process therefor that are at least as reliable for the surfaces requiring a relatively high level of corrosion resistance as that from conventional chromate conversion coating but minimizes, or most preferably entirely avoids, the use of chromium and phosphorus. Still other concurrent and/or alternative advantages will be apparent from the description below.

SUMMARY OF THE INVENTION

In at least one aspect of the invention an entirely or substantially chromium-free conversion coating composition and process for conversion coating metal surfaces is provided that provides adequate corrosion resistance in comparison with previously used chromate containing conversion coatings. In at least another aspect of the invention an article having a metal surface is provided wherein the metal surface is at least partially coated with an entirely or substantially chromium-free conversion coating that provides adequate corrosion resistance in comparison with previously used chromate containing conversion coatings.

In one embodiment, the present invention comprises an aqueous non-chromate acidic conversion coating composition that comprises, preferably consists essentially of, or more preferably consists of, water and:

(A) dissolved fluorometallate anions selected from the group consisting of $TiF_6^{-2}$, $ZrF_6^{-2}$, $HfF_6^{-2}$, $SiF_6^{-2}$, $AlF_6^{-3}$, $GeF_6^{-2}$, $SnF_6^{-2}$, $BF_4^-$, and mixtures thereof; and (B) a water-soluble polymer which is a Mannich adduct of poly(4-vinyl phenol) and N-methyl ethanolamine.

In at least another embodiment, the present invention comprises an aqueous non-chromate acidic conversion coating composition that comprises, preferably consists essentially of, or more preferably consists of, water and:

(A) dissolved fluorometallate anions selected from the group consisting of $TiF_6^{-2}$, $ZrF_6^{-2}$, $HfF_6^{-2}$, $SiF_6^{-2}$, $AlF_6^{-3}$, $GeF_6^{-2}$, $SnF_6^{-2}$, $BF_4^-$, and mixtures thereof;

(B) a water-soluble polymer which is a Mannich adduct of poly(4-vinyl phenol) and N-methyl ethanolamine; and (C) a water-soluble polymer which is a Mannich adduct of poly(4-vinyl phenol) and N-methyl glucamine.

DETAILED DESCRIPTION OF THE PREFERRED EMBODIMENTS

As required, reference will now be made in detail to presently preferred compositions or embodiments and methods of the invention, which constitute the best modes of practicing the invention presently known to the inventors. However, it is to be understood that the disclosed compositions or embodiments are merely exemplary of the invention that may be embodied in various and alternative forms.

It has been found that adequate corrosion resistance for surfaces requiring a relatively high level of corrosion resistance can be achieved by the use of an aqueous non-chromate acidic conversion coating composition that comprises, preferably consists essentially of, or more preferably consists of, water and:

(A) dissolved fluorometallate anions selected from the group consisting of $TiF_6^{-2}$, $ZrF_6^{-2}$, $HfF_6^{-2}$, $SiF_6^{-2}$, $AlF_6^{-3}$, $GeF_6^{-2}$, $SnF_6^{-2}$, $BF_4^-$, and mixtures thereof; and (B) a water-soluble polymer which is a Mannich adduct of poly(4-vinyl phenol) and N-methyl ethanolamine.

The above compositions may optionally further comprise one or more of the following:

(C) a water-soluble polymer which is a Mannich adduct of poly(4-vinyl phenol) and N-methyl glucamine; and (D) a metal to fluoride adjusting component.

Various embodiments of the invention include working compositions for direct use in treating metals, make-up concentrates from which such working compositions can be prepared by dilution with water, replenisher concentrates suitable for maintaining optimum performance of working compositions according to the invention, processes for treating metals with a composition according to the invention, and extended processes including additional steps that are conventional per se, such as cleaning, rinsing, and subsequent painting or some similar overcoating process that puts into place an organic binder-containing protective coating over the metal surface treated according to a narrower embodiment of the invention. Articles of manufacture including surfaces treated according to a process of the invention are also within the scope of the invention.

For a variety of reasons, it is sometimes preferred that compositions according to the invention as defined above should be substantially free from many ingredients used in compositions for similar purposes in the prior art. Specifically, when maximum storage stability of a concentrate, avoidance of possibly troublesome anions, and/or minimization of pollution potential is desired, it is preferred, with increasing preference in the order given, independently for each preferably minimized component listed below, that these compositions contain no more than 25, 15, 9, 5, 3, 1.0, 0.35, 0.10, 0.08, 0.04, 0.02, 0.01, 0.001, or 0.0002 percent of each of the following constituents: nitrite; halates and perhalates (i.e., perchlorate, chlorate, iodate, etc.); hydroxylamine and salts and complexes of hydroxylamine; chloride; bromide; iodide; organic compounds containing nitro groups; hexavalent chromium; ferricyanide; ferrocyanide; and pyrazole compounds. Components such as these may not be harmful in some instances, but they have not been found to be needed or advantageous in compositions according to this invention, and their minimization is therefore normally preferred at least for reasons of economy.

Except in the claims and the operating examples, or where otherwise expressly indicated, all numerical quantities used in the description of the invention to indicate amounts of material or conditions of reaction and/or use are to be understood as modified by the word "about" in describing the broadest scope of the invention. Practice within the numerical limits stated is generally preferred, however. Also, throughout the description, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) noted in the specification between one or more newly added constituents and one or more constituents already present in the composition when the other constituents are added, and does not necessarily preclude unspecified chemical interactions among the constituents of a mixture once mixed; specification of materials in ionic form implies the presence of sufficient counterions to produce electrical neutrality for the composition as a whole; any counterions thus implicitly specified preferably are selected from among other constituents explicitly specified in ionic form, to the extent possible; otherwise such counterions may be freely selected, except for avoiding counterions that act adversely to the objects of the invention; the word "mole" means "gram mole" and the word itself and all of its grammatical variations may by used for any chemical species defined by all of the types and numbers of atoms present in it, irrespective of whether the species is ionic, neutral, unstable, hypothetical, or in fact a stable neutral substance with well defined molecules; and the terms "solution", "soluble", "homogeneous phase", and the like are to be understood as including not only true equilibrium solutions or homogeneity but also dispersions that show no visually detectable tendency toward phase separation over a period of observation of at least 100, or preferably at least 1000, hours during which the material is mechanically undisturbed; the first definition of an acronym or other abbreviation applies to all subsequent uses herein of the same abbreviation and applies mutatis mutandis to normal grammatical variations of the initially defined abbreviation; the term "paint" includes all like materials that may be designated by more specialized terms such as lacquer, enamel, varnish, shellac, topcoat, and the like; and, unless otherwise explicitly stated or necessarily implied by the context, the simple term "aluminum" includes pure aluminum and those of its alloys that contain at least, with increasing preference in the order given, 55, 65, 75, 85, or 95 atomic percent of aluminum atoms.

The dissolved fluorometallate anions that constitute necessary component (A) preferably are selected from the group consisting of $TiF_6^{-2}$, $ZrF_6^{-2}$, $HfF_6^{-2}$, $SiF_6^{-2}$, $AlF_6^{-3}$, $GeF_6^{-2}$, $SnF_6^{-2}$, $BF_4^-$, and mixtures thereof, with the first two being more preferred and fluorozirconate being the most preferred. Such anions may be introduced into a treatment composition according to the invention as acids or salts, with the acids usually preferred for economy and because a net acidity of the compositions is preferable as considered further below, and the entire stoichiometric equivalent as any of the above recited fluorometallate ions in any source material as dissolved in a composition according to the invention or a precursor composition for it is to be considered as part of the fluorometallate component, irrespective of the actual degree of ionization that may occur. Independently of their chemical nature, the total concentration of the fluorometallate anions (A) dissolved in a working treatment composition according to the invention preferably is at least, with increasing preference in the order given, 0.00010, 0.0025, 0.0050, 0.0075, 0.010, 0.050 or 0.075 g/L and independently, primarily for reasons of economy, preferably is not more than, with increasing preference in the order given, 100, 75, 60, 50, 30, 25, 15, 10, 5, 2.5, 0.1, 0.75, 0.25 or 0.10 g/L.

The composition of the present invention also includes an amino-phenolic polymer component (B) comprising a Mannich adduct of poly(4-vinyl phenol) and N-methyl ethanolamine. Processes for preparing Mannich adducts of polyvinyl phenol are well known and are described in more detail in U.S. Pat. Nos. 4,376,000; 4,433,015; 4,457,790; 4,517,028; 4,963,596; 4,970,264; 5,039,770; 5,068,299; 5,116,912; 5,266,410; 5,298,289; and 5,891,952, the entire disclosure of each patent, except to the extent contrary to any explicit statement herein, is hereby incorporated herein by reference. In certain embodiments, the polymer component (B) is the Mannich adduct of poly(4-vinyl phenol) and N-methyl ethanolamine, with formaldehyde being the preferred aldehyde. Independently of their chemical nature, the total concentration of the polymer (B) dissolved in a working treatment composition according to the invention preferably is at least, with increasing preference in the order given, 0.0010, 0.0024, 0.0050, 0.075, 0.010, 0.025, 0.050, 0.060 or 0.075 g/L of total composition and independently preferably not more than, with increasing preference in the order given, 50, 25, 10, 5, 1.0, 0.5, 0.25 or 0.10 g/L.

Furthermore, independently of their actual concentrations, the concentrations of polymer (B) and fluorometallate anions (A) preferably are such that the ratio between them, in working compositions and concentrated solutions used to prepare working concentrations, is at least, with increasing preference in the order given, 0.40:1.0, 0.50:1.0, 0.60:1.0, 0.75:1.0, 0.80:1.0, 0.90:1.0 or 1.0:1.0, and independently preferably is not more than, with increasing preference in the order given, 5.0:1.0, 4.0:1.0, 3.5:1.0, 3.0:1.0, 2.5:1.0, 2.0:1.0, or 1.5:1.0.

The composition of the present invention also optionally includes an amino-phenolic polymer component (C) comprising a Mannich adduct of poly(4-vinyl phenol) and N-methyl glucamine. In certain embodiments, the polymer component (C) is the Mannich adduct of poly(4-vinyl phenol) and N-methyl glucamine, with formaldehyde being the preferred aldehyde. Independently of their chemical nature, the total concentration of the polymer (C) dissolved in a working treatment composition according to the invention preferably is at least, with increasing preference in the order given, 0.0001, 0.00050, 0.00075, 0.001, 0.0025, 0.0050, 0.0060 or 0.0075 g/L of total composition and independently preferably not more than, with increasing preference in the order given, 5.0, 2.5, 1.0, 0.5, 0.1, 0.05, 0.025 or 0.01 g/L.

Furthermore, independently of their actual concentrations, the concentrations of polymer (C) and fluorometallate anions (A) preferably are such that the ratio between them, in working compositions and concentrated solutions used to prepare working concentrations, is at least, with increasing preference in the order given, 0.75:1.0, 0.50:1.0, 0.35:1.0, 0.30:1.0, 0.25:1.0, 0.20:1.0, 0.15:1.0 or 0.10:1.0 and independently preferably is not more than, with increasing preference in the order given, 2.0:1.0, 1.0:1.0, 0.75:1.0, 0.50:1.0, 0.40:1.0, 0.30:1.0, 0.25: 1.0, or 0.20:1.0.

Also, independently of their actual concentrations, the concentrations of polymer (B) and polymer (C) preferably are such that the ratio between them, in working compositions and concentrated solutions used to prepare working concentrations, is at least, with increasing preference in the order given, 75.0:1.0, 50.0:1.0, 30.0:1.0, 25.0:1.0, 15.0:1.0, 12.5:1.0 or 10.0:1.0, and independently preferably is not more than, with increasing preference in the order given, 7.5:1.0, 5.0:1.0, 4.0:1.0, 2.5:1.0, 1.0:1.0, or 0.75:1.0.

The optional metal to fluoride adjusting component (D) comprises metallic and/or metalloid elements and/or their oxides, hydroxides, and/or carbonates selected from the group consisting of the oxides, hydroxides, and/or carbonates of silicon, zirconium, and/or aluminum and more preferably includes silica. Any form of this component that is sufficiently finely divided to be readily dispersed in water may be used in accordance with this invention, but for constituents of this component that have low solubility in water it is preferred that the constituent be amorphous rather than crystalline, because crystalline constituents can require a much longer period of heating and/or a higher temperature of heating to produce a composition no longer susceptible to settling. Solutions and/or sols such as silicic acid sols may be used, but it is highly preferable that they be substantially free from alkali metal ions as described further below. However, it is generally most preferred to use dispersions of silica made by pyrogenic processes.

An equivalent of a metallic or metalloid element or of its oxide, hydroxide, or carbonate is defined for the purposes of this description as the amount of the material containing a total of Avogadro's Number (i.e., $6.02 \times 10^{23}$) total atoms of metal and/or metalloid elements from the group consisting of Ti, Zr, Hf, B, Al, Si, Ge, and Sn. The ratio of moles of fluoroacid component (A) to total equivalents of component (B) in an aqueous composition heated according to one embodiment of this invention preferably is from 1:1 to 50:1, more preferably from 1.5:1.0 to 20:1, or still more preferably from 1.5:1 to 5.0:1.0. If desired, a constituent of this component may be treated on its surface with a silane coupling agent or the like which makes the surface oleophilic. Zirconium basic carbonate is the preferred metal to fluoride adjusting component (D) and, when present, is preferably present in the composition of the present invention in an amount that is preferably not greater than 25% of the concentration of component (A) and is more preferably present in an amount that is not greater than 15%.

The composition of the present invention can be prepared by combining the components in any order. The pH of the treatment bath should be from 1.0 to 6.0, more preferably 1.75–5.5, and most preferably from 3.0 to 5.0.

Some preferred concentrated compositions, in accordance with the present invention, comprise:

| Component | Preferred Wt. % Range | More Preferred Wt. % Range | Most Preferred Wt. % Range |
| --- | --- | --- | --- |
| A | 0.5–55.0 | 3.0–40.0 | 5.5–25.5 |
| B | 1.0–50.0 | 2.0–45.0 | 4.5–30.0 |
| C | 0–40.0 | 0.2–35.0 | 0.4–25.0 |

For use as working compositions, the concentrated composition is typically diluted, with water, to about 0.5–50 wt. %, more preferably 1.0–30 wt. %, and most preferably about 2.0–15 wt. %.

Some particularly preferred working compositions, in accordance with the present invention, comprise:

| Component | Preferred Wt. % Range | More Preferred Wt. % Range | Most Preferred Wt. % Range |
| --- | --- | --- | --- |
| A | 0.01–15.0 | 0.03–10.0 | 0.05–5.0 |
| B | 0.02–14.0 | 0.03–10.0 | 0.04–4.0 |
| C | 0–12.0 | 0.002–10.0 | 0.004–7.5 |
| DI Water | 45–99.5 | 60–99 | 72–98.5 |

It should be appreciated that the weight percents in the two preceding tables are on a wet basis and that the components referred to in those tables have percent solids similar to the percent solids of the components listed in the table preceding the above two tables.

The conversion coating compositions are suitable for treating metal surfaces to achieve excellent resistance to corrosion, particularly after subsequent conventional coating with an organic binder containing protective coating. The compositions are particularly useful on iron and steel, galvanized iron and steel, zinc and those of its alloys that contain at least 50 atomic percent zinc, and, most preferably, aluminum and its alloys that contain at least 50 atomic percent aluminum.

A process according to the invention in its simplest form consists of bringing a metal surface to be conversion coated into physical contact with a working composition according to the invention as described above for a period of time, then discontinuing such contact and drying the surface previously contacted. Physical contact and subsequent separation can be accomplished by any of the methods well known in the metal treatment art, such as immersion for a certain time, then discontinuing immersion and removing adherent liquid by drainage under the influence of natural gravity or with a squeegee or similar device; spraying to establish the contact, then discontinuing the spraying and removing excess liquid as when contact is by immersion; roll coating of the amount of liquid followed by drying into place, and the like.

Preferably the temperature of the working aqueous liquid conversion coating composition during a conversion coating process according to the invention is at least, with increasing preference in the order given, 15° C., 20° C., 25° C., 30° C., 34° C. or 37° C. and independently preferably, primarily for reasons of economy, is not more than 66° C., 60° C., 55° C., or 50° C.

The time during which physical contact is maintained between the metal surface to be conversion coated and a working aqueous liquid conversion coating composition according to the invention preferably, for reasons of economy of operation, is as short as possible, consistent with formation of a conversion coating layer as effective as desired. More specifically, the time of contact preferably is not more than, with increasing preference in the order given, 1000, 600, 450, 150, 100, 75, 50, 40, 30, 25, 20, 15, 13, 11, 10, 9.0, 8.0, 7.0, 6.0, 5.0, 4.0, 3.0, 2.0, 1.5, 1.0, 0.5 or 0.1 seconds. Spraying a heated working aqueous liquid conversion coating composition onto the surface to be conversion coated followed by removing excess liquid with a squeegee has been found effective in forming a conversion coated surface according to this invention within a few seconds at most.

Preferably the surface to be conversion coated is rinsed, in one or more stages, with water or other diluent between contact with a working aqueous liquid conversion coating composition according to the invention and drying. In this embodiment, at least the final rinse is preferably with deionized, distilled, or otherwise purified water. Drying can be accomplished by simple exposure to ambient air for a sufficient time, and indeed is preferably accomplished in this way if the conversion coated surface has been formed at a sufficiently high temperature that drying occurs within a few seconds of separation from contact with the working aqueous liquid conversion coating composition according to the invention as described above. Alternatively, one may hasten the drying by exposure of the wet surface after conversion coating to a higher temperature than the normal ambient temperature, in an oven or by any of the other means such as infrared radiant heating, microwave drying, and the like well known per se in the art.

Preferably, the coating is thick enough that it contains, with increasing preference in the order given, 1, 2.4, 5.0, 10, 20, 40, 60 or 80 milligrams per square meter of the metal surface conversion coated (hereinafter usually abbreviated as "$mg/m^2$"), measured as zirconium atoms, and independently preferably corresponds to not more than 1000, 750, 500, 400, 240 or 170 $mg/m^2$ measured as zirconium atoms. The amount of zirconium added-on may conveniently be measured with a commercially available XRF instrument, such as a Portaspec® from Cianflone Scientific, or by other means known to those skilled in the art.

After forming the conversion coating layer as described above, it is sometimes preferred to further improve the corrosion and/or staining resistance of the conversion coated surface by overcoating it with a protective layer containing at least an organic binder. It is presently contemplated that any of a wide variety of clear and pigmented paints and like materials, as generally known per se in the art can be used for this purpose. Such an overcoating preferably has a thickness after drying that is at least, with increasing preference in the order given, 0.0010, 0.0050, 0.010, 0.025 or 0.04 micrometers (hereinafter usually abbreviated as "$\mu m$") and independently preferably, primarily for reasons of economy, is not more than 1.0, 0.75, 0.25, 0.15, 0.10 or 0.075 $\mu m$. In certain embodiments, the conversion coated surface may remain uncovered, i.e., not painted.

Before conversion coating according to this invention is to be used for any metal substrate, the substrate to be conversion coated may, but is not necessarily, thoroughly cleaned and/or deoxidized by any of various methods well known to those skilled in the art to be suitable for the particular substrate to be coated. For example, for aluminum, the surface to be treated most preferably is first contacted with a conventional hot alkaline cleaner, then rinsed in hot water, then, optionally, contacted with a neutralizing acid rinse, before being contacted with the conversion coating composition of the present invention.

The practice of this invention may be further appreciated by consideration of the following, non-limiting examples, and the benefits of the invention may be appreciated by the examples set forth below.

EXAMPLES

A working composition was prepared as set forth below in Table 1.

TABLE 1

| FORMULA | Weight (lb) |
| --- | --- |
| Deionized water | 800.00 |
| Fluorozirconic acid, 20% | 100.00 |
| Component (A)[1] | 5.00 |
| Component (B)[2] | 95.00 |
| Total: | 1000.0 |

[1]Component (A) is an aqueous solution containing 10 w/o solids of a water soluble polymer (a Mannich adduct of a poly(4-vinylphenol) with N-methyl ethanolamine and formaldehyde) made according to the directions of column 11, lines 38–55 of U.S. Pat. No. 4,517,028, except that Propasol ™ P (a propoxylated propane solvent commercially available from Union Carbide Corporation) was used as the solvent instead of ethanol and no nitric acid was added.
[2]Component (B) is an aqueous solution containing 10 w/o solids of a water soluble polymer (a Mannich adduct of a poly(4-vinylphenol) with N-methyl glucamine and formaldehyde) made according to the directions of column 11, lines 39–52 of U.S. Pat. No. 4,963,596.

Samples of polished and machined aluminum wheel sections were subjected to the following multi-step process.

Step 1: Expose the sample to a 5% solution of RIDOLINE 212 (available from Henkel Corporation, of Madison Heights, Mich.) (pH=9.66) at 54° C. for 2 minutes.

Step 2: Rinse with deionized water for 30 seconds.

Step 3: Treat with a 0.5% or 2% solution of DEOXIDIZER HX-357 (available from Henkel Corporation) (pH=0.73) at 27° C. for 1 minute.

Step 4: Rinse with deionized water for 30 seconds.

Step 5: Treat with the 2% solution of the conversion coating composition concentrate described in Table 1 above (pH=3.91) at 32° C. for 2 or 3 minutes.

Step 6: Rinse with deionized water for 1 minute.

Step 7: Oven dry at 104° C. for 20 minutes.

The coated samples were then coated with a clear coat (2–4 mils) and exposed to the GM filiform test (GM 9682P) as follows:

1. Scribe a single line on the clear coated surface to reach the base metal.

2. Expose to CASS (Copper Acetic Salt Spray) (GM 4476P) test 49±2° C. for 6 h±15 minutes. The aqueous spray used was a mixture of cupric chloride (1 g/gallon of solution) and glacial acetic acid (5–6 ml/gallon of solution) solutions.

3. DI water rinse for 2 to 3 seconds.

4. Place in humidity cabinet at 60±1° C., 85±3% relative humidity (RH), with airflow 20–80 ft/min for four weeks.

5. Record the length of the longest filiform from the scribed line at the end of the fourth week.

The longest filiform length from the scribed line for each sample after 4 weeks are shown below in Table 2.

TABLE 2

| Sample | Time (min) | Deoxidizer Concentration (%) | Coating Weight (Zr/mg/ft$^2$) | Max Growth 672 hrs (mm) |
|---|---|---|---|---|
| 1 (m.w.) | 2 | 2.0 | 2.75 | 3.9 |
| 2 (p.w.) | 2 | 0.5 | 2.94 | 3 |
| 3 (m.w.) | 3 | 2.0 | 1.60 | 2.1 |
| 4 (m.w.) | 2 | 2.0 | 3.5 | 3.5 | p.w. = polished wheel section
m.w. = machined wheel section

As can be seen from the examples, the aluminum samples coated in accordance with the present invention passed the GM filiform test.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An aqueous non-chromate acidic conversion coating composition that comprises water and:
   (A) dissolved fluorometallate anions selected from the group consisting of $TiF_6^{-2}$, $ZrF_6^{-2}$, $HfF_6^{-2}$, $SiF_6^{-2}$, $AlF_6^{-3}$, $GeF_6^{-2}$, $SnF_6^{-2}$, $BF_4^-$, and mixtures thereof; and
   (B) a water-soluble polymer which is a Mannich adduct of poly(4-vinyl phenol) and N-methyl ethanolamine.

2. The composition of claim 1 further comprising (C) a water-soluble polymer which is a Mannich adduct of poly(4-vinyl phenol) and N-methyl glucamine.

3. The composition of claim 1 wherein component (A) comprises fluorozirconic acid.

4. The composition of claim 2 wherein component (A) comprises fluorozirconic acid.

5. The composition of claim 2 wherein component (A) is present in the composition in an amount of 0.0001 to 100 g/L.

6. The composition of claim 5 wherein component (A) is present in the composition in an amount of 0.01 to 1.0 g/L.

7. The composition of claim 2 wherein component (B) is present in the composition in an amount of 0.001 to 50 g/L.

8. The composition of claim 7 wherein component (B) is present in the composition in an amount of 0.025 to 0.25 g/L.

9. The composition of claim 2 wherein component (C) is present in the composition in an amount of 0.0001 to 5.0 µL.

10. The composition of claim 9 wherein component (C) is present in the composition in an amount of 0.0025 to 0.05 g/L.

11. The composition of claim 9 wherein the ratio of component (B) to component (C) is between 25.0:1.0 to 0.75:1.0.

12. The composition of claim 2 wherein the pH of the composition comprises 1.0 to 6.0.

13. The composition of claim 2 wherein the composition consists essentially of water and
   (A) dissolved fluorometallate anions selected from the group consisting of $TiF_6^{-2}$, $ZrF_6^{-2}$, $HfF_6^{-2}$, $SiF_6^{-2}$, $AlF_6^{-3}$, $GeF_6^{-2}$, $SnF_6^{-2}$, $BF_4^-$, and mixtures thereof;
   (B) a water-soluble polymer which is a Mannich adduct of poly(4-vinyl phenol) and N-methyl ethanolamine; and
   (C) a water-soluble polymer which is a Mannich adduct of poly(4-vinyl phenol) and N-methyl glucamine.

14. The composition of claim 13 wherein the composition consists of water and
   (A) dissolved fluorometallate anions selected from the group consisting of $TiF_6^{-2}$, $ZrF_6^{-2}$, $HfF_6^{-2}$, $SiF_6^{-2}$, $AlF_6^{-3}$, $GeF_6^{-2}$, $SnF_6^{-2}$, $BF_4^-$, and mixtures thereof;
   (B) a water-soluble polymer which is a Mannich adduct of poly(4-vinyl phenol) and N-methyl ethanolamine; and
   (C) a water-soluble polymer which is a Mannich adduct of poly(4-vinyl phenol) and N-methyl glucamine.

15. A method of treating metal, the method comprising:
   providing a metal surface; and
   exposing at least a portion of the metal surface to an aqueous non-chromate acidic conversion coating composition that comprises water and:
   (A) dissolved fluorometallate anions selected from the group consisting of $TiF_6^{-2}$, $ZrF_6^{-2}$, $HfF_6^{-2}$, $SiF_6^{-2}$, $AlF_6^{-3}$, $GeF_6^{-2}$, $SnF_6^{-2}$, $BF_4^-$, and mixtures thereof; and
   (B) a water-soluble polymer which is a Mannich adduct of poly(4-vinyl phenol) and N-methyl ethanolamine; and
   allowing the composition to form a conversion coating on the portion of the metal surface.

16. The method of claim 15 wherein the composition further comprises (C) a water-soluble polymer which is a Mannich adduct of poly(4-vinyl phenol) and N-methyl glucamine.

17. The method of claim 16 wherein the metal comprises aluminum and its alloys.

18. The method of claim 17 wherein the metal surface is a surface of a wheel.

19. The method of claim 18 wherein the coating has an amount of total coating weight added on of 1.0 to 500.0 mg/m$^2$, measured as zirconium atoms.

20. A conversion coated article, the article comprising:
   a metal surface; and
   a coating on the metal surface, the coated comprising the dried product of the composition of claim 2.

21. The article of claim 20 further comprising a paint layer directly over the coating.

* * * * *

UNITED STATES PATENT AND TRADEMARK OFFICE
CERTIFICATE OF CORRECTION

PATENT NO. : 6,821,633 B2
DATED : November 23, 2004
INVENTOR(S) : Jianping Lui et al.

It is certified that error appears in the above-identified patent and that said Letters Patent is hereby corrected as shown below:

Column 9,
Line 49, delete "$\mu$L" and insert therefor -- g/L --.

Signed and Sealed this

Twenty-sixth Day of April, 2005

JON W. DUDAS
*Director of the United States Patent and Trademark Office*